United States Patent
Rheinfrank, Jr.

[15] 3,647,047
[45] Mar. 7, 1972

[54] INCLINED DRAG CONVEYOR FOR HOT ASPHALT MIX AND THE LIKE

[72] Inventor: Lamson Rheinfrank, Jr., Kansas City, Mo.
[73] Assignee: Standard-Havens, Inc., Glasgow, Mo.
[22] Filed: July 31, 1969
[21] Appl. No.: 846,344

[52] U.S. Cl. ...................................................... 198/174
[51] Int. Cl. ...................................................... B65g 19/06
[58] Field of Search ................. 198/174, 171, 172, 168, 111, 198/117, 204

[56] References Cited

UNITED STATES PATENTS 3,111,217  11/1963  Asher ..................................... 198/174

Primary Examiner—Evon C. Blunk
Assistant Examiner—Alfred N. Goodman
Attorney—Scofield, Kokjer, Scofield & Lowe

[57] ABSTRACT

The lower flight of the slatted drag chain of the conveyor is yieldably biased toward the floor plate. The biasing force is obtained through the medium of idler wheels interposed between the flights and supported for floating movement between adjustable limit stops away from and back toward the floor plate.

2 Claims, 4 Drawing Figures

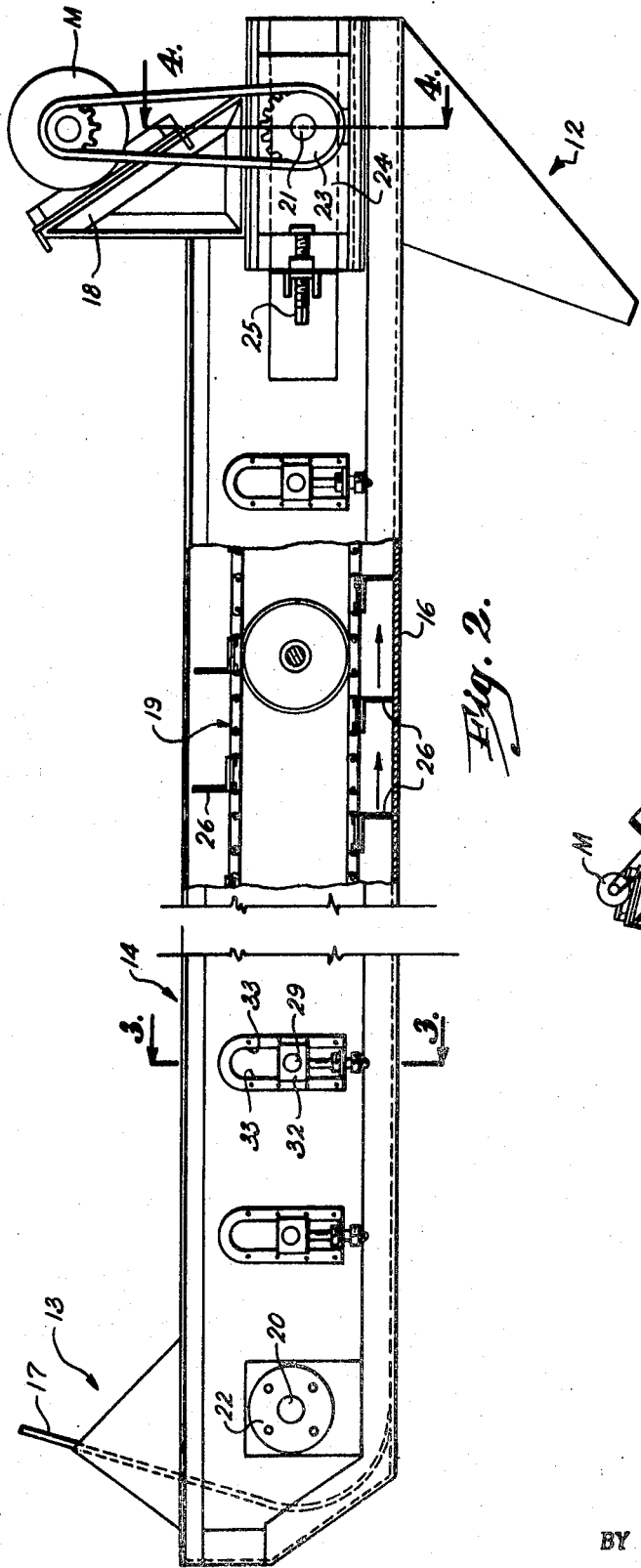
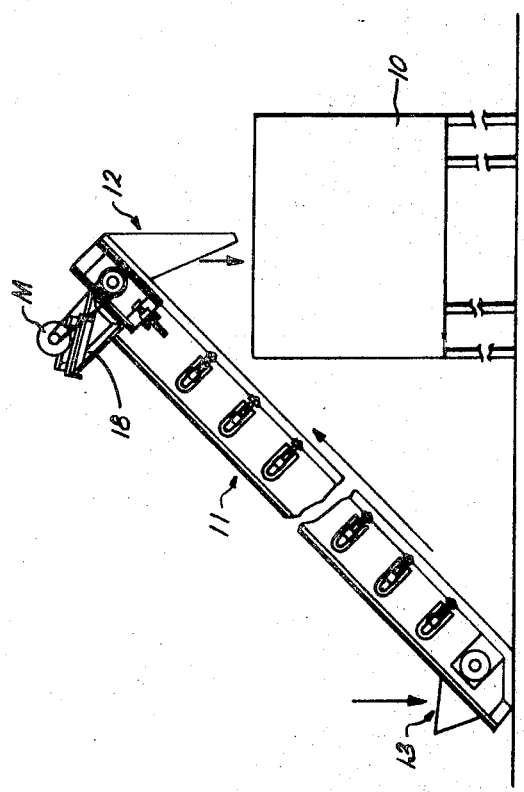

INVENTOR
Lamson Rheinfrank Jr.

INCLINED DRAG CONVEYOR FOR HOT ASPHALT MIX AND THE LIKE

BACKGROUND AND SUMMARY OF THE INVENTION

The conveying of such materials as asphalt hot mix on inclined drag conveyors has long posed a problem.

Such a conveyor normally is constructed in the form of an elongate trough having a flat bottom called a floor plate. Materials are elevated in the trough or, as it is sometimes called, drag pan along the floor plate by the combined pushing and scraping action of blade or slat members carried by and spaced along endless drag chains located within the trough. The lower flight of the chain runs near the floor plate so that the slats can engage and propel the mix while the upper flight is a return flight operable to return the slats from the upper discharge end of the conveyor to the lower input or loading end.

One of the principal difficulties encountered in the operation of conventional conveyors is that of achieving an effective continuous cleaning of the drag pan. To obtain an optimum cleaning, the drag slats would obviously run and be held as close to the surface of the floor plate as possible. However, this permits large pieces of aggregate to wedge between the slats and the floor plate which causes breakage and other problems. Therefore, it is necessary to permit sufficient spacing (that is, an ability of the slats to ride away from the floor plate) to pass the large pieces. This, however, introduces another disadvantage. The hot mix has a tendency to adhere to the floor plate and, if the conveyor slats or blades are not held down, they will ride outwardly on the mix on a hydroplaning" effect and the efficiency of conveying is materially reduced. A simple remedy would be to increase the weight of drag chain and lower slats to a point where the desired effect is achieved but this results in a very heavy structure and, of course, considerable added material expense.

One of the principal advantages of the present invention is that it provides apparatus in which the difficulties above described are overcome while still retaining the benefits of the principal of a drag chain conveyor.

In my invention, I make provision for permitting movement of the drag slats away from the floor plate a distance sufficient to pass the large aggregate when wedging is imminent. However, the drag slats are yieldably biased toward a minimum spacing with respect to the floor plate so that they will normally run close to or on the floor plate. The principal biasing force is provided by the weight of the upper, or return, flight of the drag chain which, when needed, is transmitted to the lower flight. Thus the weight of both flights is on occasion brought into play as a force tending to press the drag slat toward the floor plate. However, if wedging takes place, the slats can, as required, separate from the floor plate to pass the wedge material and will immediately be returned back toward the normal conveying position when the material is passed.

An additional feature of a conveyor according to my invention is that the circumstances under which the upper flight weight is applied can, within limits of practicality, be varied as desired. This feature assists not only in enabling the handling of mixes of differing aggregate size but also in permitting repairing of the floor plate by simply fitting a new plate over the old one. The lower limit stop for the biasing force will simply be raised to accommodate the thickness of the new plate. The time and expense of repairs is thus greatly reduced when compared with the former practice of removing the old plate and installing a new one.

Other and further objects of the invention, together with the features of novelty appurtenant thereto will appear in the course of the following description.

DETAILED DESCRIPTION

In the accompanying drawings which form a part of the specification, and are to be read in conjunction therewith, and in which like reference numerals indicate like parts in the various views;

FIG. 1 is a generally schematic side elevational view of a typical asphalt hot mix installation including an incline conveyor and silo or storage bin, the breaklines indicating interrupted length, the incline conveyor embodying a preferred form of the invention;

FIG. 2 is a greatly enlarged side elevational view of the conveyor, the breaklines again indicating interrupted length and with part of the sidewall of the trough broken away to expose the conveyor chain slats and an idler roller;

Figure 3:
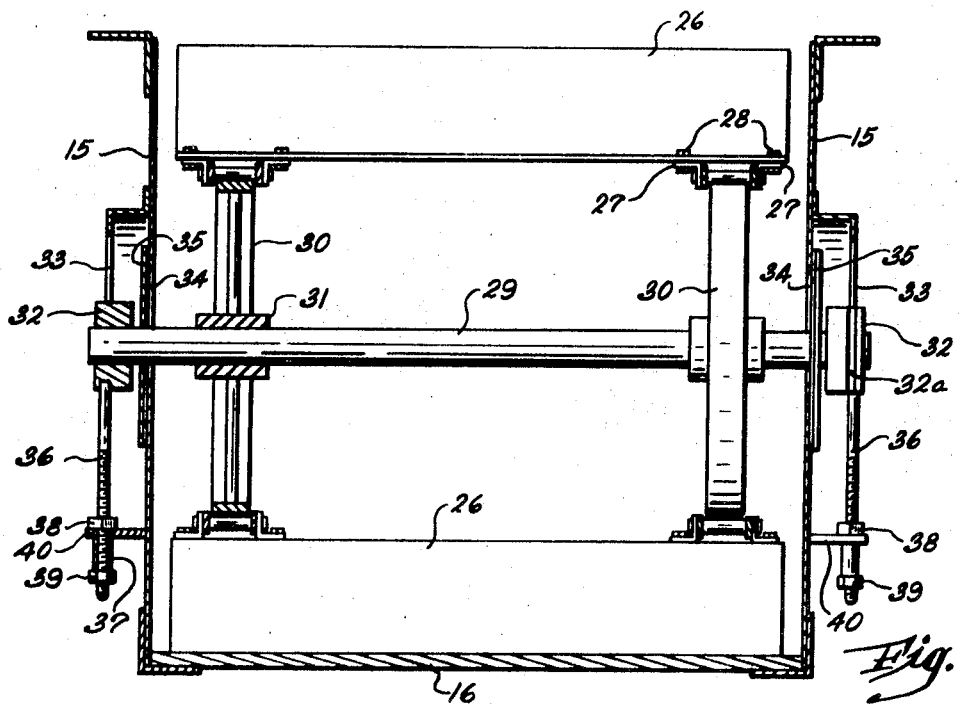
FIG. 3 is an enlarged transverse sectional view taken generally along line 3—3 of FIG. 2 in the direction of the arrows.

Referring now to the drawing and initially to FIG. 1, reference numeral 10 indicates generally a silo or storage tank for asphalt hot mix. The silo receives hot mix as supplied from the incline conveyor 11 which is positioned with its discharge chute 12 above the silo. The input hopper to the conveyor is indicated at 13. The arrows indicate the direction of the movement of mix from ground to discharge into the silo.

Turning now to the remaining figures of the drawing, the main body of the conveyor comprises an essentially U-shaped trough 14 which has spaced parallel sidewalls 15 and a bottom floor plate 16. At the input end a guide plate 17 directs mix from the input hopper toward and onto the floor plate 16. At the other end of the conveyor is mounted the discharge chute 12 and a motor mount assembly 18, the details of which are not important to an understanding of my invention.

Figure 4:
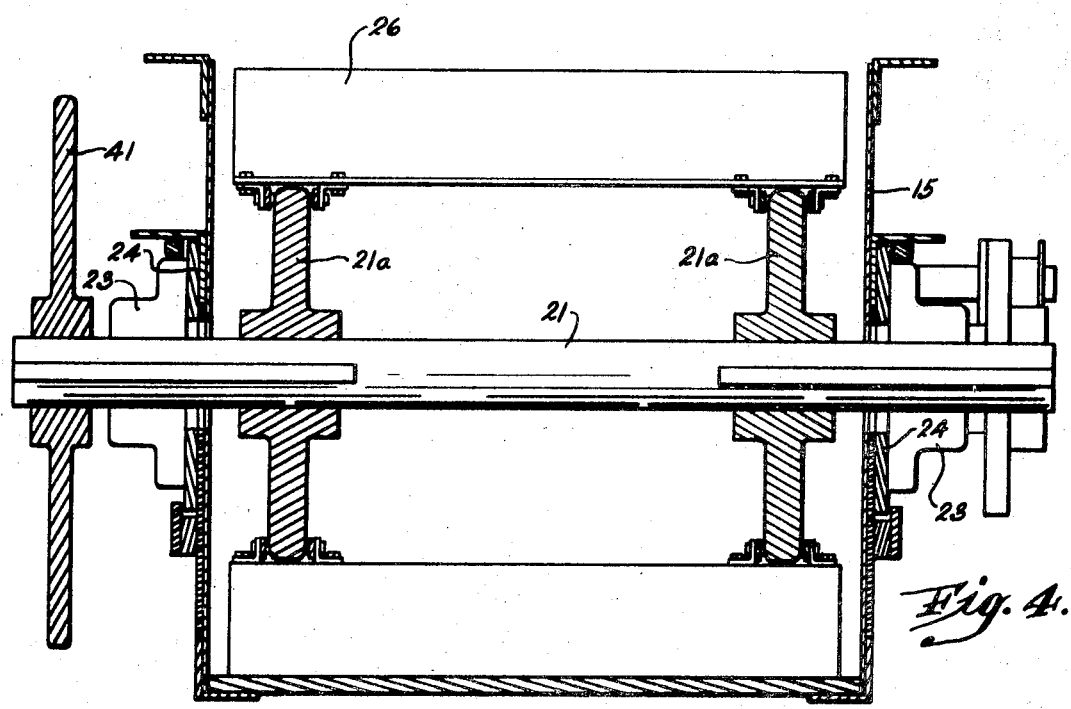
FIG. 4 is an enlarged sectional view taken generally along line 4—4 of FIG. 2 in the direction of the arrows.

Positioned within the trough 14 and extending lengthwise thereof is an endless carrier which, in the preferred embodiment of the invention, comprises a pair of parallel drag chains 19. These chains are of the link type and are trained near opposite ends of the trough about sprockets mounted on shafts 20 and 21 respectively. The sprockets on shaft 20 are not shown but those on shaft 21 are shown in FIG. 4, they being identified by reference numeral 21a. It will be understood that the sprocket arrangement at the input end is essentially the same as at the discharge end except that in the latter case, as will be seen, the sprockets are driven from a power source.

Shaft 20 is supported at the opposite sidewalls by bearings 22 which are secured to the sidewalls. Shaft 21 is journaled in similar bearings 23 which are mounted on plates 24 which can be adjusted in the lengthwise direction of the trough to decrease or increase the tension in the chains. Tightening or loosening the chains is accomplished through thrust bolts 25 (one on each side of the conveyor connected with plates 24). Such belt tightening arrangements are conventional.

Firmly secured to chain 19 and spaced at uniform intervals therealong are the drag slats 26. These preferably are in the form of right-angle members extending transversely of the chain with one leg projecting outwardly from the chain so that as the slat moves along the lower flight it will be adjacent the floor plate 16. Any suitable means for connecting the slats to the chain can be utilized. In the preferred embodiment, they are connected by means of small brackets 27 which connect with the pins of the chain and are bolted as at 28 to the base leg of the slat member.

Spaced at intervals along the length of the trough and between the flights of the chains are parallel shafts 29, each of which has mounted thereon a pair of idler wheels 30. The idler wheels are positioned to register with the individual chains and have rim portions which are slightly lesser than the inside length of the roller pins. Each wheel has a hub 31 which mounts it on the shaft 29.

The opposite ends of the shaft 29 are journaled in bearings 32 which are capable of limited up and down floating movement. The bearings are guided in the up and down movement by flange edges 33 which engage within grooves 32a (FIG. 3) in the opposite side edges of each bearing.

The flange edges 33 are formed as part of an arch-shaped structure which is bolted or otherwise firmly secured to the exteriors of the sidewalls of the pan. The shaft projects into the bearing 32 through an opening 34 in the conveyor sidewall, the opening being elongated in the upright direction to permit movement of the shaft therein. The opening 34 is covered from the exterior by a sheet 35 of rubber or other material which is slip-fitted over the shaft 29 between the bearing 32 and the sidewall.

The height and width of sheet 35 is substantially greater than that of the opening 34 so that the sheet will seal the opening for all possible positions of shaft 29.

Secured to the underside of each bearing 32 and extending therebelow is a stem or rod 36 which is threaded along its lower end portion. The lower end of the stem has fitted thereon a sleeve 37 which is retained between nuts 38 and 39. The threaded sleeve 37 is slidably received through an aperture in a bracket 40 secured to and extending outwardly from the sidewall. Nuts 38 and 39 serve as limit stops for controlling the displacement of bearings 32 and thus the rollers 30 carried thereby.

Normally it is desirable that the location of the limit stop 38 be such that when the slats 26 along the lower flight of the chain are resting on the floor plate 16 there will be a slight spacing between the roller chain links of the lower flight and the rim of the wheels 30. In normal practice this spacing should be approximately one-fourth inch so that the slats may have one-fourth-inch play between the floor plate and wheel rim. The length of the sleeve 37 controls the position of the lower nut 39 and this can be adjusted as desired. In other words, if increased permissible displacement is desired, a longer sleeve 37 can be substituted which will effectively change the position of nut 39.

The drag chain is driven in conventional fashion by a chain drive from a motor M on motor mount 18 to a drive sprocket 41 on shaft 21. As earlier noted, the direction of rotation is such as to move the lower flight of the chains upwardly along the floor plate.

During operation of the conveyor, the slats normally will run close to the floor plate and thus will carry mix upwardly along the floor plate as it is introduced through the input hopper 13. Small pieces of aggregate and the like can be slipped without wedging due to the one-fourth-inch free play between the lower conveyor flight and the rollers 30. However, in the event that larger pieces are encountered, i.e., pieces which require for passage beneath the slats a spacing of the slats greater than one-fourth-inch from the floor plate, the slats can move outwardly more than one-fourth-inch free play distance. What occurs is that as the slats move upwardly they engage the rollers and, if the forces are great enough, the rollers will also be displaced upwardly. Not only is the weight of the roller encountered in this movement, but also the weight of the upper flight is picked up. The weight of the upper flight thus becomes a biasing force which, along with whatever weight is present in shaft 29 and rollers 30, will act to attempt to return the lower flight slats toward the floor plate.

Once the large pieces pass, the slats will again return toward the floor plate. The effect is to maintain an effective conveying action while still permitting automatic adjustment of the slats in the event of wedging action between the slats and floor plate of large pieces. The weight of the upper flight and the rollers also tends to maintain the lower flight slats in close relationship with the floor plate thus to promote effective cleaning action and efficiency in the conveying operation.

It will be evident that changes in the circumstances under which the weight of the upper flight becomes effective can easily be made by adjusting the position of the stop nuts 38 and 39 on stems 36. If greater free play is desired, nuts 38 and 39 with the sleeve therebetween can be moved downwardly on their respective stems which has the effect of raising the rollers 30 relative to the floor plate.

The latter action makes it possible to repair the floor plate without requiring alteration. All that need be done is to place a new floor plate along the bottom and set nuts 38 and 39 so as to compensate for the increased thickness.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth, or shown in the accompanying drawings, is to be interpreted as illustrative and not in a limiting sense.

Having thus described my invention, I claim:

1. A conveyor for hot asphalt mix and the like comprising:
   a trough inclined from the vertical and having a bottom floor plate and spaced sidewalls,
   endless flexible carrier means positioned within and extending longitudinally of said trough and having a lower flight running near the floor plate and an upper flight remote from said floor plate,
   rotary support means for said carrier means positioned near the opposite ends of said trough and about which said carrier means is trained,
   means for driving said carrier means in a direction that moves said lower flight along said floor plate,
   transverse slats mounted on and spaced along said carrier means with the slats to the outside of the carrier means whereby those slats moving along the lower flight confront said floor plate, and
   a plurality of upper fight support members interposed between said upper and lower flights, spaced lengthwise along said trough, and connected with said trough for movement in directions toward and away from said floor plate but restrained from substantial movement longitudinally of said trough, each such member supported at a preselected spacing with respect to said lower flight and for forceable displacement in the direction away from said floor plate upon engagement therewith of the lower flight whereby to yieldably bias the drag slats on the lower flight toward said floor plate at times when said slats move away from said floor plate a predetermined extent, said flight support members comprising idler wheels mounted on axles extending between said sidewalls, bearing for said axles, and means mounting said bearings to said sidewalls for floating movement of said bearings toward and away from said floor plate.

2. A conveyor as in claim 1 wherein
   said carrier means comprises a pair of parallel roller chains having their planes substantially normal to the floor plate, said idler wheels engaging said chains.

* * * * *